United States Patent
Wolf et al.

(10) Patent No.: US 8,157,489 B2
(45) Date of Patent: Apr. 17, 2012

(54) TOOL FOR CHIP REMOVING MACHINING AND A CUTTING INSERT THEREFOR

(75) Inventors: Mathias Wolf, Valbo (SE); Michael Limell, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1271 days.

(21) Appl. No.: 11/822,539

(22) Filed: Jul. 6, 2007

(65) Prior Publication Data

US 2008/0075547 A1  Mar. 27, 2008

(30) Foreign Application Priority Data

Sep. 25, 2006 (SE) ....................................... 0602013

(51) Int. Cl.
*B23B 51/00* (2006.01)

(52) U.S. Cl. ......... 408/223; 408/224; 408/713; 407/113

(58) Field of Classification Search ................. 408/223, 408/224, 230, 227, 229, 713; 407/113, 114, 407/115, 116
See application file for complete search history.

(56) References Cited

U.S. PATENT DOCUMENTS

| | | | | |
|---|---|---|---|---|
| 5,810,521 A | * | 9/1998 | Pantzar et al. | 407/114 |
| 5,951,214 A | * | 9/1999 | Rothballer et al. | 407/42 |
| 5,954,459 A | * | 9/1999 | Noguchi et al. | 408/59 |
| 5,971,676 A | * | 10/1999 | Kojima | 408/231 |
| 6,244,791 B1 | * | 6/2001 | Wiman et al. | 407/114 |
| 6,669,412 B1 | * | 12/2003 | Hirose et al. | 407/113 |
| 6,948,891 B2 | * | 9/2005 | Roman | 408/223 |
| 7,147,407 B2 | * | 12/2006 | Satran | 407/42 |
| 2004/0219395 A1 | * | 11/2004 | Imamura et al. | 428/698 |

FOREIGN PATENT DOCUMENTS

| | | | |
|---|---|---|---|
| JP | 06134611 A | * | 5/1994 |
| JP | 2001269808 A | * | 10/2001 |
| JP | 2003094222 A | * | 4/2003 |
| JP | 2003165009 A | * | 6/2003 |
| WO | 03/099494 | | 12/2003 |
| WO | 03/099495 | | 12/2003 |

* cited by examiner

*Primary Examiner* — Daniel Howell
*Assistant Examiner* — Paul M Janeski
(74) *Attorney, Agent, or Firm* — Morgan, Lewis & Bockius LLP

(57) ABSTRACT

A tool for chip removing machining, including a basic body and two replaceable cutting inserts. Each insert includes a chip-removing main edge situated between a chip surface and a clearance surface, a first insert of which precedes a second insert during machining of a workpiece. The cutting inserts overlap each other in a zone defined by a borderline along which a surface generated by the main edge of the first cutting insert, with a time delay, is intersected by the main edge of the subsequent, second cutting insert. The main edge of the second cutting insert that afterwards intersects the already generated surface, is formed along a chip surface including primary and secondary sections, which have different shapes in cross-sections spaced-apart along the main edge in order to form a primary part edge and a secondary, reinforced part edge arranged to intersect the already generated surface.

29 Claims, 6 Drawing Sheets

TOOL FOR CHIP REMOVING MACHINING AND A CUTTING INSERT THEREFOR

This application claims priority under 35 U.S.C. §119 to Sweden Patent Application No. 0602013-5, filed on Sep. 25, 2006, the disclosure of which is incorporated by reference herein in its entirety.

FIELD OF THE INVENTION

The present invention relates generally to a cutting tool for chip removing machining of the type that includes a basic body and two replaceable cutting inserts, which individually include a chip-removing main edge situated between a chip surface and a clearance surface, a first one of which precedes the second one during machining of a workpiece, the cutting inserts overlapping each other in a zone defined by a borderline along which a surface generated by the main edge of the first cutting insert, with a certain time delay, is intersected by the main edge of the subsequent, second cutting insert. The invention also relates to a cutting insert for the tool.

BACKGROUND OF THE INVENTION

Problems associated with rotatable tools in the form of drills for the machining of, above all, workpieces of metal, form the basis of this invention. More precisely, problems have been observed in the type of indexable-insert tools disclosed in International Patent Publication Nos. WO 03/099494 and WO 03/099495, and commercially available under the trademark CoroDrill 880®. In just this type of indexable-insert drill, the workpiece is entered initially by a radially outer part edge included in an individual main edge of a center insert, the part edge generating a surface of revolution in the form of a ring-shaped groove in the workpiece. Each infinitesimal section of this groove is passed afterwards, viz. after further rotation of half a revolution of the drill, by a peripheral cutting insert, which—in order to completely machine the entire cross-section of the hole to be made—partly overlaps the sweep area of the center insert, i.e., an inner part of the active main edge of the peripheral cutting insert extends a distance into the already generated groove.

The center insert of the known drill is formed with main edges, more precisely four main edges, each of which has a Z-like shape by including two mutually displaced part edges, the radially outermost one of which is located a distance in front of the part edge situated innermost as viewed in the axial feeding direction of the tool. The individual peripheral cutting insert, which generally enters and machines the workpiece at a stage after the outer part edge of the center insert, but before the inner part edge thereof, is however, in practice, formed with straight main edges, the edge lines of which extend linearly between surface-wiping secondary edges adjacent to corners of the cutting insert. The cutting inserts have generally a positive cutting geometry so far that the chip surface positioned inside the edge line, as well as a possibly occurring chamfer surface (reinforcement bevel), forms an acute angle with the clearance surface of the cutting insert.

The aforementioned problems manifest themselves in that chippings and cracks arise in the peripheral cutting insert, i.e., the cutting insert that afterwards intersects the groove-shaped surface of revolution that already has been generated by the outer part edge of the center insert. Such crack formation may at times develop into drill breakdowns.

Problems with chipping and crack formation may also be found in other types of cutting tools, in particular rotatable cutting tools, of the type that includes two or more cutting inserts operating in sequence one after the other, the sweep areas of which overlap each other, more precisely in the subsequent cutting insert that, with a certain time delay, intersects a surface already generated by a preceding cutting insert. As non-limiting examples of such tools, milling cutters in the form of cylindric cutters and boring tools, respectively, are included.

SUMMARY OF THE INVENTION

The present invention aims at managing the above-mentioned problems and at providing an improved cutting tool and an improved cutting insert therefore. Therefore, a primary object of the invention is to provide a cutting insert suitable for cutting tools, the geometrical design of which is of such a nature that the risk of chippings and tendencies to crack is counteracted efficiently. In this connection, the importance of the desired solution being based on the geometrical design of the cutting insert, rather than on the choice of material of the same, is emphasized. In other words, the drill cutting insert should still be able to be produced from hard, and thereby wear resistant, materials having a long service life, and not from more ductile materials, which, per se, are less inclined to crack.

In an embodiment, the invention provides a tool for chip removing machining, including a basic body and two replaceable cutting inserts. Each insert includes a chip-removing main edge situated between a chip surface and a clearance surface, a first insert of which precedes a second insert during machining of a workpiece. The cutting inserts overlap each other in a zone defined by a borderline along which a surface generated by the main edge of the first cutting insert, with a time delay, is intersected by the main edge of the subsequent, second cutting insert. The main edge of the second cutting insert that afterwards intersects the already generated surface, is formed along a chip surface including primary and secondary sections, which have different shapes in cross-sections spaced-apart along the main edge in order to form a primary part edge and a secondary, reinforced part edge arranged to intersect the already generated surface.

In another embodiment, the invention provides a cutting insert, including a chip-removing main edge having an edge line situated between a clearance surface and a chip surface. The chip surface includes two sections in the form of primary and secondary sections, which have different shapes in different cross-sections in order to form a primary part edge and a secondary, reinforced part edge.

The invention is above all applicable to rotatable cutting tools, primarily drills, but also milling cutters. However, the possibility of applying the general idea of the invention also to immobile cutting tools, such as fixedly mounted reaming tools or turning tools, is not excluded.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figures 1, 2:
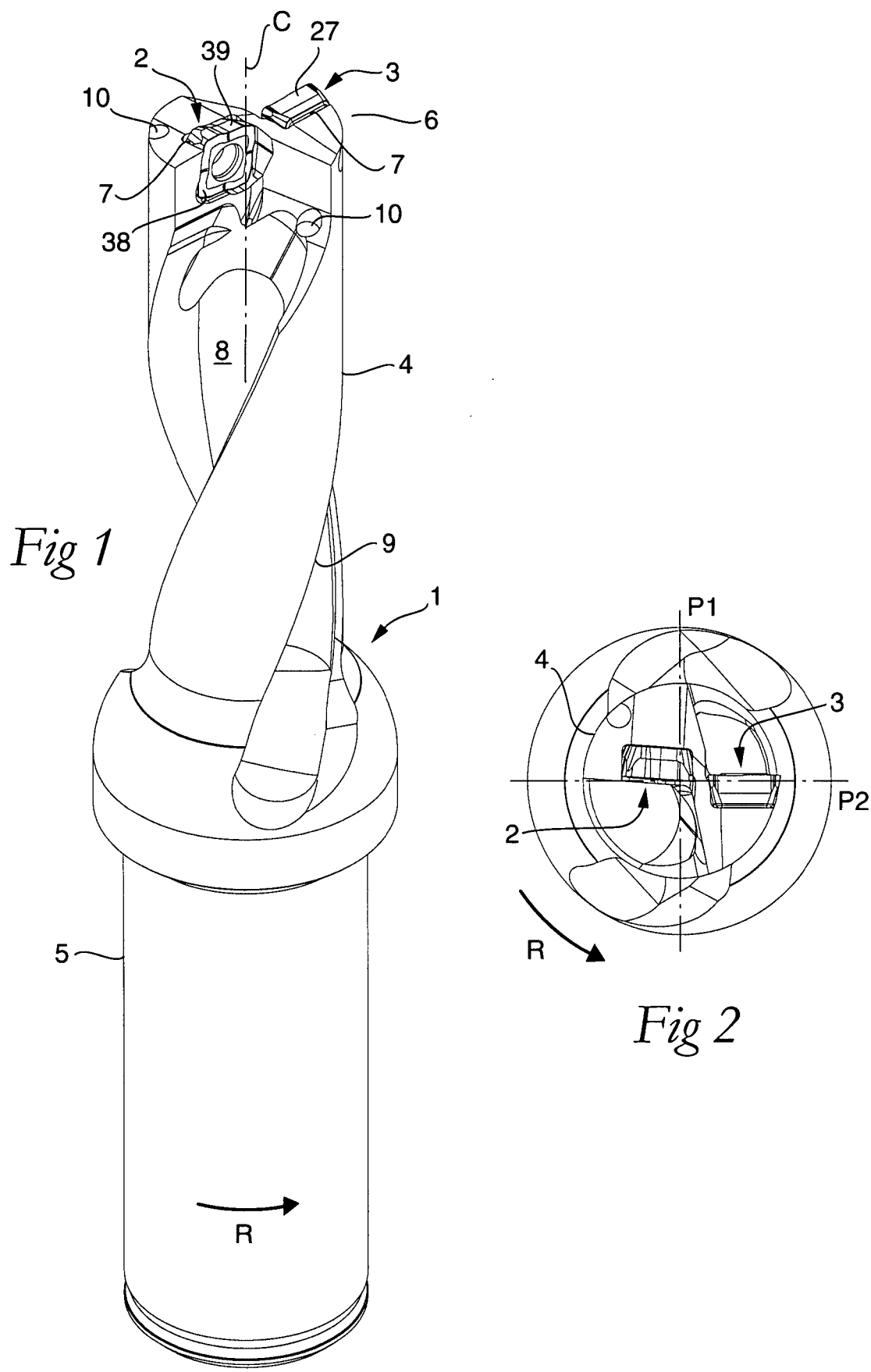
FIG. 1 is a perspective view of a cutting tool in the form of an indexable-insert tool according to an embodiment of the invention.
FIG. 2 is an end view showing the front end of the tool in FIG. 1.

The tool shown in FIGS. 1 and 2 includes a basic body in the form of a drill body 1, as well as two replaceable cutting inserts, one of which is a center insert 2, and the other a peripheral cutting insert 3. The drill body 1 includes a front part 4 in the form of a shank, as well as a rear part 5, which in this case is thicker than front part 4 and is for mounting in a machine, which can set the tool in rotation. The cutting inserts 2, 3 are arranged at the front end 6 of the drill body. The drill body 1 may be, but does not need to be, solid and manufactured from, for instance, steel, while the cutting inserts 2, 3 are manufactured from a harder and more wear-resistant material, such as cemented carbide.

Each individual cutting insert is mounted in a pocket 7. Rearward from the individual pocket 7, a chip flute 8 extends, which in this case is helicoidal and delimited by a concavely arched limiting surface. The two chip flutes are situated between two bars 9, the envelope surfaces of which are cylindrical. The chip flutes 8 may also have another shape, e.g., a straight shape. Internally in the drill body 1, channels 10 run, which mouth in the front end 6 of the drill body and convey liquid to the cutting inserts and the chip flutes with the object of cooling the cutting inserts and the chips, and supporting the chip evacuation from the cutting inserts.

Figure 3:
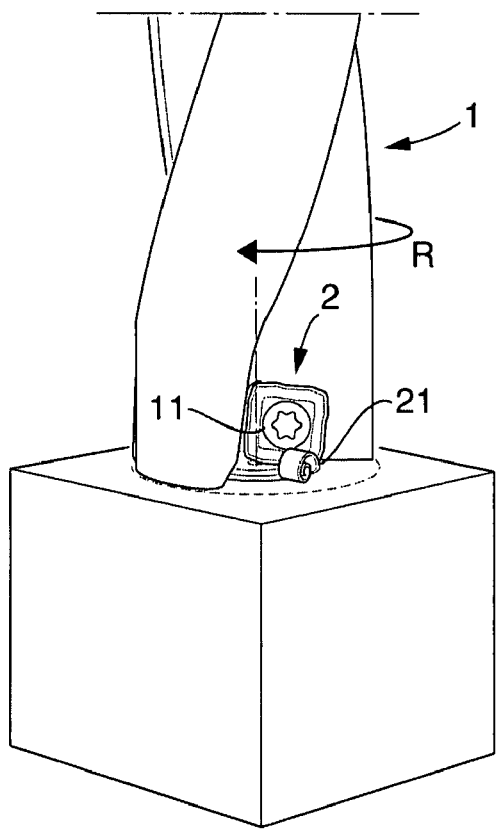
FIG. 3 is a partial perspective view showing the center insert of the tool during machining of a workpiece.
Figure 4:
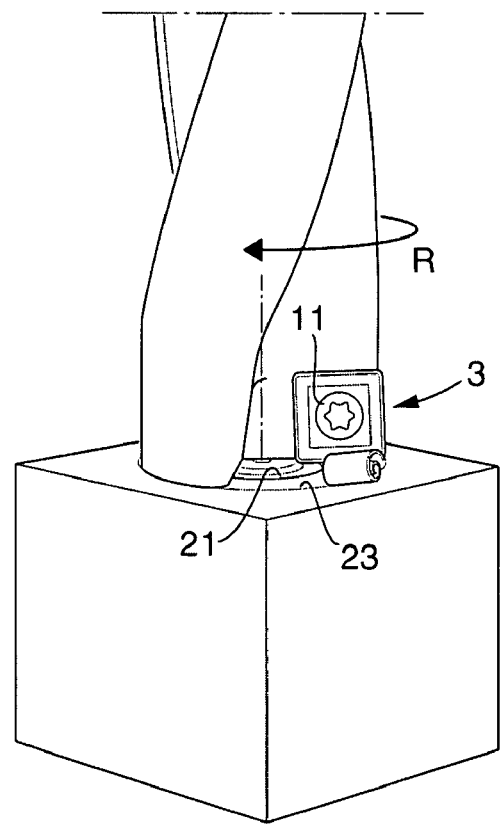
FIG. 4 is an analogous perspective view showing the peripheral cutting insert in operation after further rotation of half a revolution of the tool.

The cutting inserts 2, 3 are fixed in the appurtenant pockets 7 by screws 11, which are not shown in FIG. 1, but in FIGS. 3 and 4.

Furthermore, the tool is rotatable around a center axis designated C, in particular in the direction of rotation R. In FIG. 2, P1 and P2 designate imaginary reference planes, which intersect each other at right angles and divide the cross-section of the tool into four quadrants. The peripheral cutting insert 3 is in its entirety situated beside the plane P1, while the major part of the center insert 2 is situated on the opposite side of the plane P1. The main edges of the cutting inserts are situated in or near the plane P2.

Reference is now made to FIGS. 3-6, which in more detail illustrate the operation of the known drill of the type Coro-Drill 880®.

Figure 5:
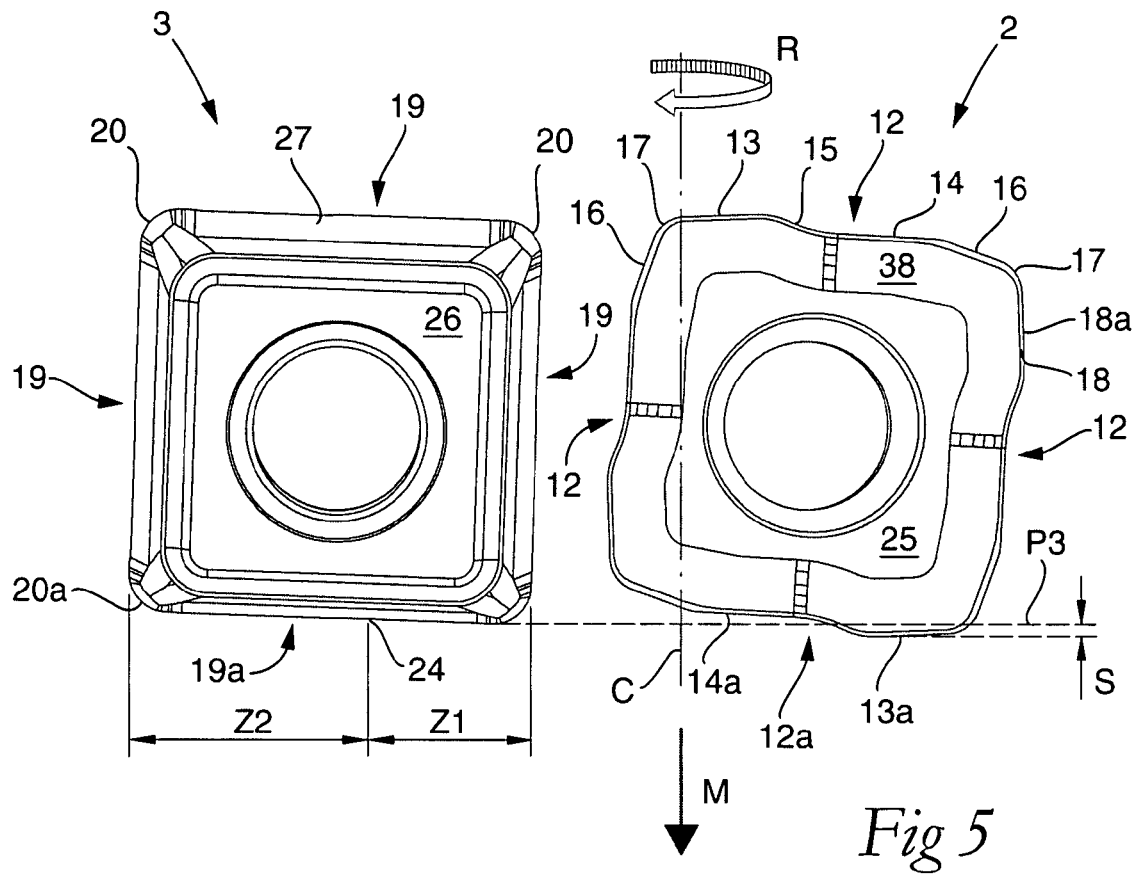
FIG. 5 is a schematic view showing the topside of the center insert and the underside of the peripheral cutting insert, and illustrating the positions of the cutting inserts in relation to the geometrical center axis of the tool.

In FIG. 5, it is seen that the center insert 2, as well as the peripheral cutting insert 3, includes four chip-removing main edges 12, 19. Each main edge 12 of the center insert 2 is formed between a chip surface 38 and a clearance surface 39 (see FIG. 1) and includes two part edges 13, 14, which are mutually displaced and transform into each other via an intermediate edge 15. At the four corners of the cutting insert, the individual part edge 13 transforms into an angled portion 16 of the part edge 14. Portion 16 transforms in turn into in an adjacent main edge via a rounded corner edge 17. In FIG. 5, the tool is shown with the feeding M directed downward. In this state, the lower main edge designated 12a is active, while the other main edges 12 are inactive. As is clearly seen in FIG. 5, the first part edge 13 projects axially a distance in relation to the part edge 14, which in practice means that the part edge 13 enters and machines the workpiece before the part edge 14. The axially front part edge 13 is situated radially outside the part edge 14. A chamfer surface or reinforcement bevel 18 is provided adjacent to the edge line 18a of the edges.

The peripheral cutting insert 3, which, contrary to the center insert 2, is shown from behind in FIG. 5, has a square basic shape and includes four straight main edges 19, which are interparallel in pairs, and which individually extend between a pair of secondary edges 20 at adjacent corners of the cutting insert. The lower, active main edge 19a co-operates functionally with the connecting, radially outer secondary edge 20a in such a way that the main edge 19a acts as a chip-removing edge, while the secondary edge 20a exerts a surface-wiping effect on the generated hole surface. Furthermore, it should be noted that the cutting insert is tipped-in at an acute angle in relation to the center axis C. More precisely, the inactive outer main edge 19, which extends axially rearward from the corner edge 20a, forms an angle of about 2° with the center axis C. In other words, outer main edge 19 has a certain clearance in the backward direction from the corner edge 20a in relation to the cylindrical hole surface generated.

Figure 6:
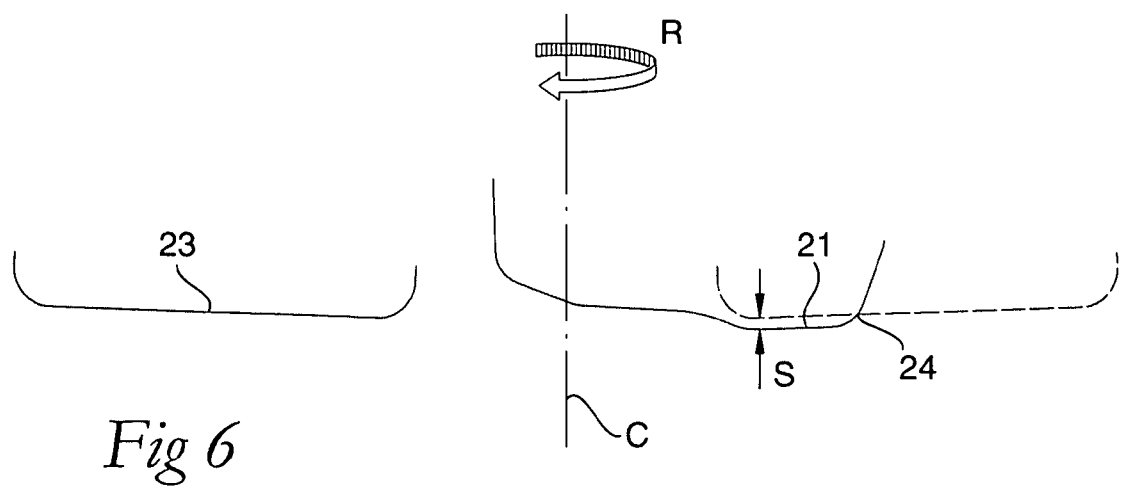
FIG. 6 is a schematic view showing the contour shape of the surfaces of revolution generated by the respective cutting inserts.

In FIG. 5, P3 designates an imaginary plane that extends perpendicularly to the center axis C. In relation to plane P3, the part edge 13a of the center insert 2 projects in the forward direction, while the inner part of the active main edge 19a of the peripheral cutting insert 3 is located approximately in the plane P3. Furthermore, the radially inner part edge 14a of the center insert is situated behind the plane P3 as viewed in the feeding direction M. The result of this placement of the edges is that the workpiece is first entered by the radially outer part edge 13a of the center insert, then by the active main edge 19a of the peripheral cutting insert 3, and finally by the inner part edge 14a of the center insert. This function is also illustrated in FIG. 6, which schematically illustrates how the part edge 13a of the center insert generates a surface of revolution in the form of a groove 21 in the workpiece (see also FIG. 3). To the left in FIG. 6, a groove-shaped surface of revolution 23, generated by the active main edge 19a of the peripheral cutting insert 3, is shown by a solid line. When the peripheral cutting insert after rotation of half a revolution (and simultaneous axial feeding) passes the groove surface 21 in the plane of the drawing, in the position shown by a dashed line to the right in FIG. 6, the main edge 19a of the peripheral cutting insert will intersect the groove surface 21 along a borderline represented by point 24, wherein the radially inner part of the main edge 19a will move in the air at a certain distance "s" from the bottom of the groove 21, and only a limited, radially outer part of the main edge 19a will provide chip removal. In other words, the two main edges 12, 19 of the cutting inserts overlap each other in a common, ring-shaped sweep area, the radially outer limitation of which is an imaginary, circular borderline, which is generated when the point 24 rotates. In FIG. 5, the overlapping zone is designated Z1, while the ring-shaped zone in which the main edge 19*a*, de facto, removes chips is designated Z2.

In this connection, one and the same type of center and peripheral cutting inserts, respectively, may be used on drill bodies having different diameters, for drilling holes having different diameters within a shown interval. Depending on the drill diameter, in doing so, the intersection point 24 will be located on different positions along the main edge 19*a* of the peripheral cutting insert.

Reference is now made to FIGS. 7-11, which illustrate a peripheral cutting insert according to an embodiment of the invention. Generally, the cutting insert includes a topside, such as represented by a plane surface 25 having a square contour shape, an underside 26 (see FIG. 5), and four clearance surfaces 27 adjacent to the four main edges 19 of the cutting insert. The edge line of the individual main edge 19 is generally designated 28. Between each edge line and the plane topside 25 of the cutting insert, chip surfaces 29 are formed, which in this case have a concave basic shape. The individual clearance surface 27 is suitably plane and forms a certain, moderate angle with an imaginary plane, extending along the edge line and being parallel to the center axis C1 of the cutting insert. In practice, this clearance angle may be 5-15°. Thus the edge delimited between the clearance surface and the chip surface is comparatively acute. In this connection, convex clearance surfaces 22 are formed also adjacent to the arched corner edges 20 of the cutting insert and form transitions between adjacent, plane clearance surfaces 27.

Between the topside 25 and the underside 26, a through hole 40 extends for the appurtenant fixing screw 11. Hole 40 is concentric having the center axis C1 and occupies a great part of the surface extension of the cutting insert in the neutral plane. As such, the amount of material (cemented carbide) between the inside of the hole and the four main edges 19 and the clearance surfaces (which are equidistantly spaced-apart from the center axis C1) is small. In other words, the cutting insert is comparatively fragile.

In previously known peripheral cutting inserts of the kind in question, the edge line of the individual main edge and the chip surface positioned inside the main edge have extended unbroken from one end of the edge to the other, i.e., the edge has had the same acute shape (positive cutting geometry) along the entire length thereof.

Characteristic of the cutting insert according to the invention shown in FIGS. 7-11 is that each one of the chip surfaces 29 of the cutting insert is formed with two different sections 29*a*, 29*b*, which have different cross-section shapes so as to form two part edges 19*a*, 19*b* having different properties. In this case, the differing cross-section shapes of the two surface sections 29*a*, 29*b* have been provided by the surface portions of the sections positioned closest to the edge line 28 forming differently large angles with the clearance surface 27. Thus, a surface portion 34 situated closest to the edge line 28*a* (see also FIG. 9) along a primary surface section 29*a* forms a first, acute angle α with the clearance surface 27, while a corresponding surface portion 35 (see also FIG. 10) along a secondary section 29*b* and the clearance surface 27 mutually form a second angle β that is larger than the first-mentioned angle α. In other words, the part edge 19*a* along the primary section 29*a* is, in a conventional way, fairly acute and easy-cutting in order to provide optimum chip removal, while the part edge 19*b* along the secondary section 29*b* is less acute and thereby stronger.

Figure 7:
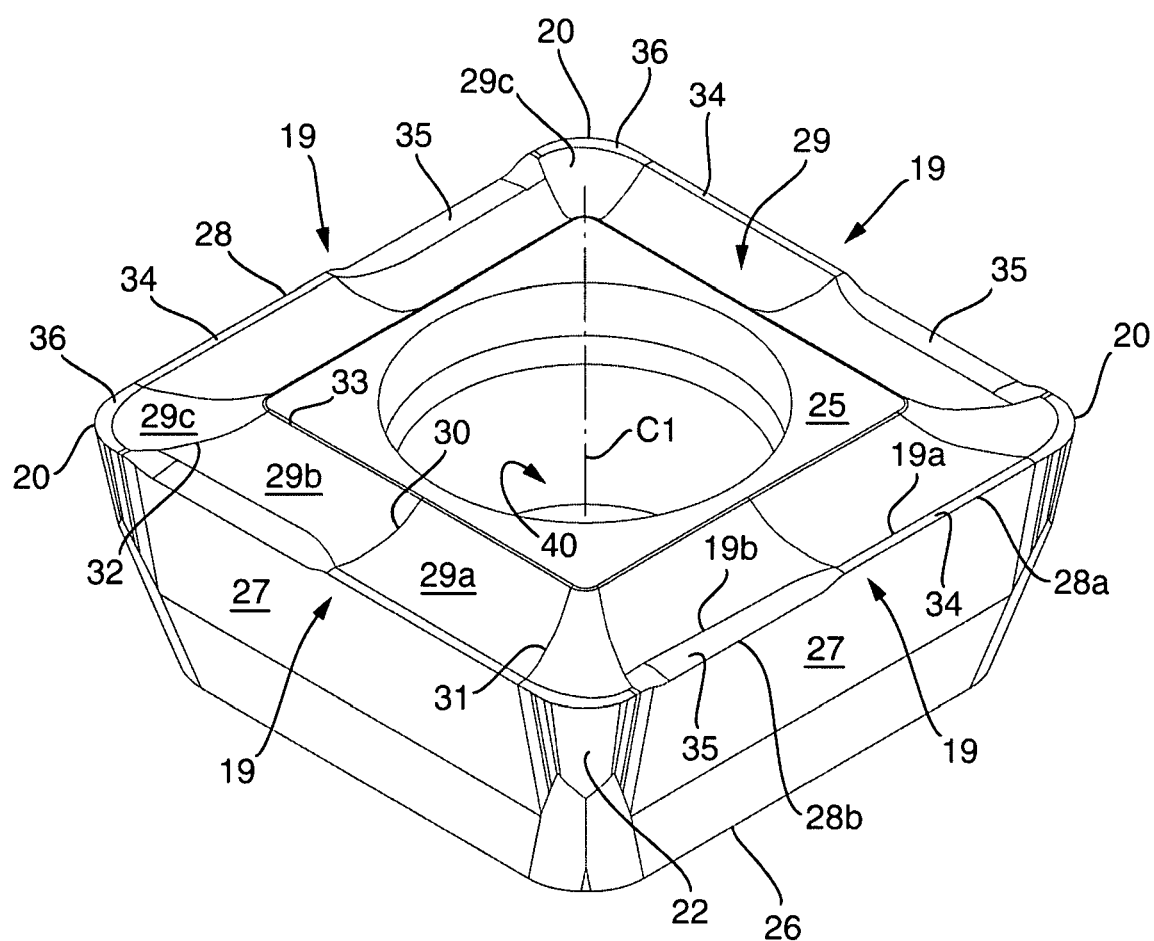
FIG. 7 is a perspective view of a peripheral cutting insert according to an embodiment of the invention.

In FIG. 7, the sections 29*a*, 29*b* are shown spaced-apart by an arc line 30, two additional arc lines 31, 32 generally marking the length extension of the two sections. However, arc lines 30, 31, 32 are fictitious and have been used to mark the approximate lengths of the two chip-surface sections 29*a*, 29*b*, as well as to make clear that the chip surface in this case has a concave basic shape. In reality, the arc lines do not exist on the cutting insert, because the circumferential chip surface 29 has one and the same concave basic shape in the part thereof connected against the topside 25 via the borderline 33. However, the different chip-surface sections 29*a*, 29*b* have different cross-section shapes in the vicinity of the edge line, such as will be described in more detail below.

Figure 9:
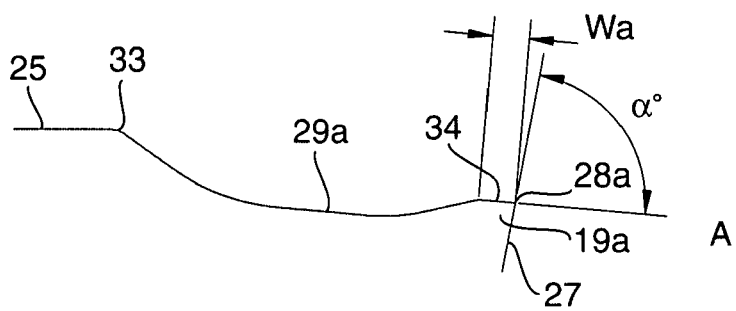
FIG. 9 is a schematic illustration showing the geometrical design of the cutting insert at section A in FIG. 8.

Even if the part edge 19*a* in the section 29*a* is comparatively acute, the same includes a chamfer surface 34 adjacent to the edge line 28*a* (see FIG. 9, for example). This chamfer surface 34, which forms the surface portion of the chip-surface section 29*a* situated closest to the edge line, serves as a traditional so-called reinforcement bevel. In practice, the chamfer surface 34 is plane and comparatively narrow, e.g., having a width of the order of 0.1 mm.

The part edge 19*b* along the secondary chip-surface section 29*b* (see FIG. 10) also includes a chamfer surface 35 adjacent to the edge line 28*b*. However, this chamfer surface 35 is considerably wider than the chamfer surface 34 and simultaneously forms a larger angle β with the clearance surface 27 than the chamfer surface 34. As such, the edge-reinforcing effect of the chamfer surface 35 is considerably greater than the corresponding effect of the narrow chamfer surface 34.

Figure 10:
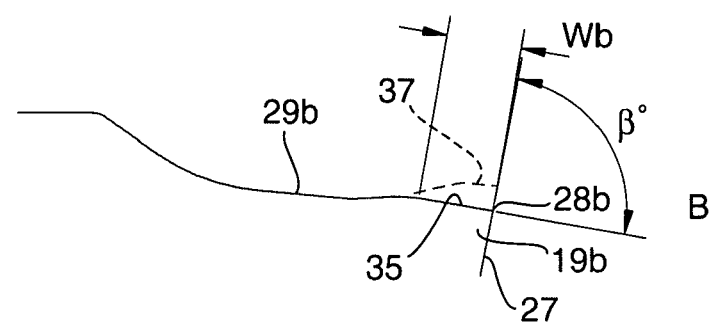
FIG. 10 is a schematic illustration showing the geometrical design of the cutting insert at section B in FIG. 8.

In FIG. 10, the cross-section shape of the primary part edge 19*a* is outlined by a dashed line 37. Accordingly, the modification of the edge shape that has been undertaken along the section 29*b* includes that the material contained between the wider chamfer surface 35 and the dashed line 37 has been removed in the section 29*b*. Thus, the part 19*b* of the main edge 19 extending along the section 29*b* is generally more obtuse and stronger than the part 19*a* that extends along the section 29*a*.

In the shown, example, the chamfer surface 34 is equally narrow along the entire length La thereof, such as determined by the distance between the borderlines 30, 31. Along the major part of the length Lb thereof, the wider chamfer surface 35 is also equally narrow. However, in the connection thereof to the chamfer surface 34, the chamfer surface 35 tapers successively.

In practice, the two chamfer surfaces 34, 35 may be plane and approximately equally long. However, at least one of the chamfer surfaces, in particular the chamfer surface 35, may have a shape other than plane. Thus, it may have a slightly convex shape determined by a great radius of curvature.

Figure 8:
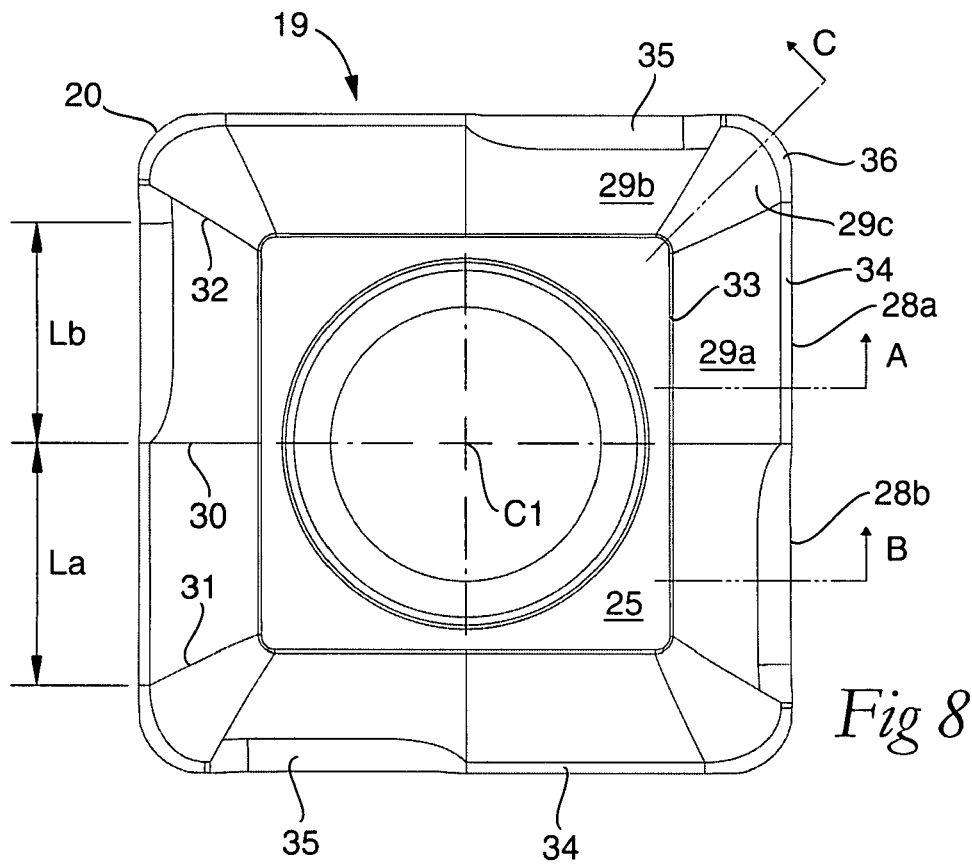
FIG. 8 is a plan view from above of the milling insert in FIG. 7.
Figure 11:
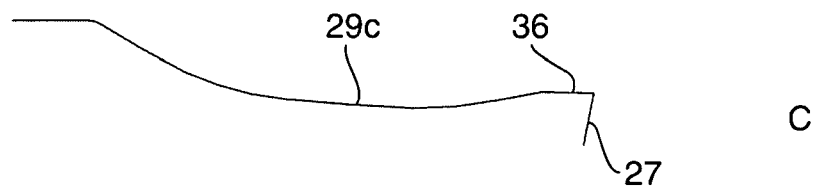
FIG. 11 is a schematic illustration showing the geometrical design of the cutting insert at section C in FIG. 8.

As seen in FIGS. 7, 8 and 11, a sector-shaped, concavely shaped section 29*c* of the chip surface forms a transition between two adjacent sections 29*a* and 29*b*. This section 29*c* connects to a reinforcing chamfer surface 36 at the corner edge 20. In FIG. 11, it is seen that the corner chamfer surface 36 is somewhat wider than the chamfer surface 34, and narrower than the chamfer surface 35.

In FIG. 9, Wa designates the width of the chamfer surface 34, while Wb in FIG. 10 designates the width of the chamfer surface 35. The difference between the widths of the chamfer surfaces may vary depending on the application of the cutting insert. However, the width Wb of the chamfer surface 35 should be at least 1.5 times greater than the width Wa of the chamfer surface 34. In the example shown, the ratio Wb:Wa=0.214:0.100. If the section 29*a* at all includes a reinforcing chamfer surface 34, the width Wb of the chamfer surface 35 should, however, be at most ten times greater than the width Wa of the chamfer surface 34.

Furthermore, the angle β should be at least 2° larger than the angle α. In the example shown, where the clearance angle of the clearance surface 27 is 11°, the angle α is 84.0°, while the angle β is 88.5°. In practice, the angle α should not exceed 85°, while the angle β should not be below 85°.

In the embodiment shown of the cutting insert, the reinforcing chamfer surface 35 has been provided by "being folded down" in relation to the chamfer surface 34. This means that the part-edge line 28b, to which the chamfer surface 35 connects, is located on a lower level than the corresponding part-edge line 28a along the chamfer surface 34. The part-edge lines 28a, 28b transform into each other via an utmost short part-edge line adjacent to the tapering part of the chamfer surface 35 (see FIG. 7).

An advantage of the invention is that the active main edge of a subsequent cutting insert, in this case the peripheral cutting insert, obtains a strong reinforcement in the area where the main edge intersects the surface of revolution (which is strain hardened in connection with the creation thereof) generated by a preceding cutting insert. In other words, the intersection point 24 will be located along the strongly reinforced secondary part edge 19b when the drill rotates during operation. In such a way, any tendency to chip or crack formation is efficiently counteracted in this part of the main edge.

Tests made in connection with the creation of the invention have shown that the crack-formation problems in the previously known cutting inserts have become particularly pronounced when the tool vibrates during operation. Upon use of the cutting insert according to the invention, no chippings or cracks at all could be observed, not even when the drill is subjected to intensive vibrations. Furthermore, an unexpected advantage of the invention has turned out to be that the chip-forming is improved in connection with machining of long-chipping materials, e.g., steel having a low carbon content.

Figure 12:
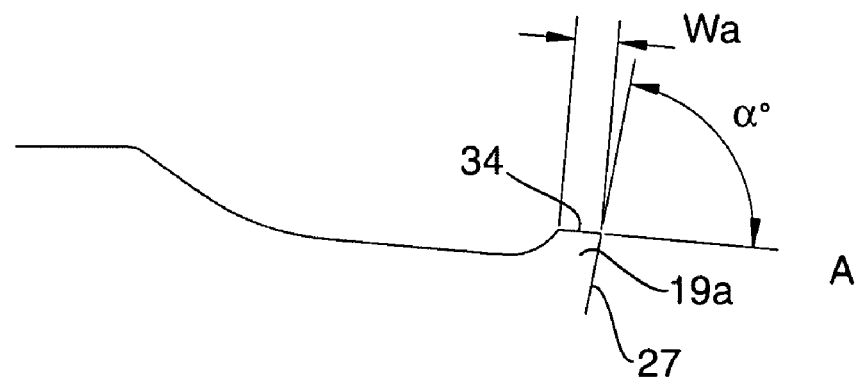
FIG. 12 is an analogous section A of an alternative embodiment of the cutting insert according to the invention.
Figure 13:
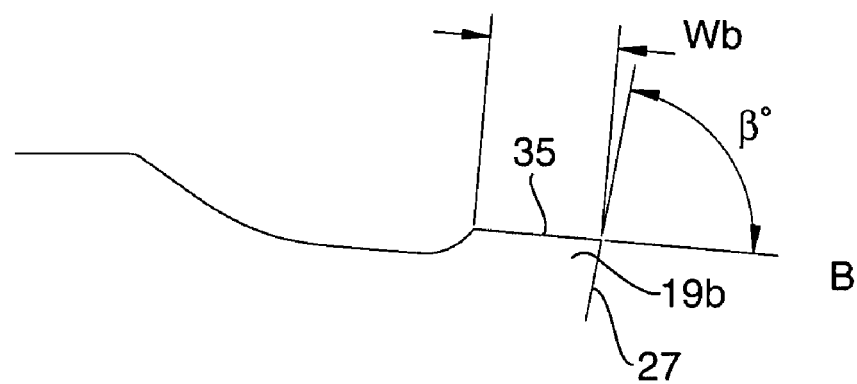
FIG. 13 is an analogous section B of an alternative embodiment of the cutting insert according to the invention.

The problem that forms the basis of the invention can be solved in two principally different ways. The solution shown in FIGS. 7-11 is essentially based on the fact that the reinforced, secondary edge is provided by increasing the edge angle, i.e., the angle β between the chamfer surface 35 and the clearance surface 27. In FIGS. 12 and 13, an alternative embodiment of the cutting insert according to the invention is shown, in which the desired reinforcement has been provided by imparting a greater width to the secondary chamfer surface 35 than to the primary chamfer surface 34, without differentiating the angles between the chamfer surfaces and the clearance surface. In FIGS. 12 and 13, the angle α between the chamfer surface 34 and the clearance surface 27 is accordingly as large as the angle β between the chamfer surface 35 and the clearance surface 27, the width Wb of the chamfer surface 35 of the rein-forced part edge being greater than the width Wa of the chamfer surface 34. In the example, Wb is about three times greater than Wa, α and β being approx. 85°.

The invention is not limited only to the embodiments described above and shown in the drawings. Thus, the geometrical shape of the cutting insert may be varied within the scope of the invention. For example, in the example shown, the two sections of the chip surface are located in extension of each other, i.e. adjacent to a generally straight main edge. However, this does not exclude that the invention also may be applied to indexable-insert drill cutting inserts having angled or broken edges. Furthermore, it is feasible to form the two differing chip-surface sections adjacent to a common, straight edge line. In this case, material is "accumulated" in the secondary chip-surface section so as to provide the reinforced, secondary part edge, instead of being removed, such as has been exemplified above (see FIG. 10). As a consequence of the fact that the reinforcing chamfer surface along the secondary section of the chip surface in the example shown has a pronounced length extension, one and the same peripheral cutting insert can be used on drill bodies having different diameters, without the intersection point of the main edge running the risk of ending up along the acute and fragile part edge of the main edge. However, if the main edge always intersects the already generated surface of revolution in one and the same predetermined point, the length of the reinforced part edge can be considerably reduced while retaining an optimum length of the easy-cutting, chip-removing part edge. Furthermore, the geometrical shape of the exemplified chamfer surfaces may be varied most considerably. Thus, the limiting lines of the chamfer surfaces may be not only linear but also arched in most intricate configurations. Furthermore, the clearance surfaces adjacent to the main edges of the cutting insert not necessarily have to be continuous, plane surfaces. Thus, also the individual clearance surface may be divided into part sections adjacent to appurtenant part edges, the two sections having different clearance angles.

The invention is applicable not only to drills but also to other cutting tools, in particular rotatable ones. Thus, the invention may also be applied to milling cutters, such as cylindric cutters (the cutting inserts overlapping each other axially instead of radially). Other, feasible cutting tools are reaming tools irrespective of whether the same are rotatable or immobile. It is even feasible to apply the invention to genuinely stationary cutting tools, such as turning tools or the like.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
   a basic body and two replaceable cutting inserts, each insert including a chip-removing main edge situated between a chip surface and a clearance surface, a first one of the inserts of which precedes a second one of the inserts during machining of a workpiece, the cutting inserts overlapping each other in a zone defined by a borderline along which a surface generated by the main edge of the first cutting insert is intersected by the main edge of the subsequent, second cutting insert during machining of the workpiece,
   wherein the chip surface situated along the main edge of the second cutting insert, that afterwards intersects the surface generated by the main edge of the first cutting insert, includes primary and secondary sections which have different shapes in cross-sections spaced-apart along the main edge in order to form a primary part edge and a secondary, reinforced part edge arranged to intersect the surface generated by the main edge of the first cutting insert.

2. The tool according to claim 1, wherein the tool is rotatable and the cutting inserts are arranged to generate surfaces of revolution, the borderlines of which are circular.

3. The tool according to claim 2, wherein the tool is a drill, which includes a drill body being the basic body, and a center insert and a peripheral cutting insert being the cutting inserts, which are mounted in two pockets formed in a front end of the drill body, from which pockets chip flutes extend in a rearward direction along the drill body, and during rotation of the drill, the main edges of the two cutting inserts overlapping each other in a ring-shaped overlapping zone.

4. The tool according to claim 3, wherein the chip surface is included in the peripheral cutting insert and is connected to the chip-removing main edge, which transforms into a functionally co-operating, surface-wiping secondary edge located at a corner of the cutting insert, the primary part edge being located between the secondary edge and the secondary part edge.

5. The tool according to claim 4, wherein the peripheral cutting insert has a square basic shape and includes four main edges parallel in pairs and situated at equal distances from a center, as well as four secondary edges situated corner-wise, the edge lines of which are arched and individually form a transition between the edge line of a primary part edge included in a given main edge, and the edge line of a secondary part edge included in an adjacent main edge.

6. The tool according to claim 1, wherein the two chip-surface sections' surface portions of the cutting insert situated closest to the main edge form differently large angles ($\alpha$, $\beta$) with the clearance surface so that the angle ($\alpha$) between the surface portion of the primary section connected to the main edge and the clearance surface is smaller than the angle ($\beta$) between the surface portion of the secondary section connected to the main edge and the clearance surface.

7. The tool according to claim 6, wherein the second angle ($\beta$) is at least 2° larger than the first angle ($\alpha$).

8. The tool according to claim 6, wherein the first angle ($\alpha$) is at most 85°.

9. The tool according to claim 6, wherein the second angle ($\beta$) is at least 85°.

10. The tool according to claim 1, wherein the chip surface has a concave basic shape and at least one of the chip-surface sections includes a chamfer surface adjacent to the main edge.

11. The tool according to claim 10, wherein the two chip-surface sections include a chamfer surface, and the chamfer surface included in the secondary chip-surface section has a smallest width that is greater than the greatest width of the chamfer surface included in the primary chip-surface section.

12. The tool according to claim 10, wherein the chamfer surface is equally wide along the major part of a length extension thereof.

13. The tool according to claim 11, wherein the two chip-surface sections are substantially equally long.

14. The tool according to claim 1, wherein angles ($\alpha$, $\beta$) between the surface portions of the two chip-surface sections situated closest to the main edge and the clearance surface are equally large.

15. The tool according to claim 1, wherein a part-edge line along the secondary section of the chip surface is situated on a lower level than a part-edge line along the primary section.

16. A cutting insert, comprising:
a chip-removing main edge having an edge line situated between a clearance surface and a chip surface, wherein the chip surface includes two sections in the form of primary and secondary sections, which have different shapes in different cross-sections in order to form a primary part edge and a secondary, reinforced part edge, wherein a part-edge line along the secondary section of the chip surface is situated on a lower level than a part-edge line along the primary section.

17. The cutting insert according to claim 16, wherein the insert is a drill cutting insert.

18. The cutting insert according to claim 17, wherein the insert is a peripheral cutting insert, the chip-removing main edge of which transforms into a functionally co-operating, surface-wiping secondary edge adjacent to a corner of the cutting insert, the primary part edge of the main edge being located between the secondary edge and the secondary part edge.

19. The cutting insert according to claim 18, wherein the insert has a square basic shape and includes four main edges parallel in pairs and situated at equal distances from a center, as well as four secondary edges situated corner-wise, the edge lines of which are arched and individually form a transition between the edge line along a primary part edge and the edge line along the secondary part edge of an adjacent main edge.

20. The cutting insert according to claim 16, wherein the surface portions of the two chip-surface sections situated closest to the edge line form differently large angles ($\alpha$, $\beta$) with the appurtenant clearance surface so that the angle ($\alpha$) between the surface portion of the primary chip-surface section connected to the edge line and the clearance surface is smaller than the angle ($\beta$) between the surface portion of the secondary section and the clearance surface.

21. The cutting insert according to claim 20, wherein the second angle ($\beta$) is at least 2° larger than the first angle ($\alpha$).

22. The cutting insert according to claim 20, wherein the first angle ($\alpha$) is at most 85°.

23. The cutting insert according to claim 20, wherein the second angle ($\beta$) is at least 85°.

24. The cutting insert according to claim 16, wherein angles ($\alpha$, $\beta$) between the two sections and the appurtenant clearance surface are equally large.

25. The cutting insert according to claim 16, wherein the chip surface has a concave basic shape and at least one of the chip-surface sections includes a chamfer surface adjacent to the edge line.

26. The cutting insert according to claim 16, wherein the two chip-surface sections include a chamfer surface, and the chamfer surface included in the secondary chip-surface section has a smallest width that is greater than the greatest width of the chamfer surface included in the primary chip-surface section.

27. A cutting insert, comprising:
a chip-removing main edge having an edge line situated between a clearance surface and a chip surface, wherein the chip surface includes two sections in the form of primary and secondary sections, which have different shapes in different cross-sections in order to form a primary part edge and a secondary, reinforced part edge, wherein the two chip-surface sections include a chamfer surface, and the chamfer surface included in the secondary chip-surface section has a smallest width that is greater than the greatest width of the chamfer surface included in the primary chip-surface section, and
wherein each chamfer surface is equally wide along the major part of a length extension thereof.

28. A cutting insert, comprising:
a chip-removing main edge having an edge line situated between a clearance surface and a chip surface, wherein the chip surface includes two sections in the form of primary and secondary sections, which have different shapes in different cross-sections in order to form a primary part edge and a secondary, reinforced part edge, wherein the two chip-surface sections include a chamfer surface, and the chamfer surface included in the secondary chip-surface section has a smallest width that is greater than the greatest width of the chamfer surface included in the primary chip-surface section, and
wherein the two chip-surface sections are substantially equally long.

29. The cutting insert according to claim 25, wherein the chamfer surface is plane.

* * * * *